United States Patent

[11] 3,552,681

| [72] | Inventors | Charles A. Vogel;<br>James William Forrest Blackie, Sunnyvale, Calif. |
|---|---|---|
| [21] | Appl. No. | 740,349 |
| [22] | Filed | June 26, 1968 |
| [45] | Patented | Jan. 5, 1971 |
| [73] | Assignee | Newell Industries, Inc.<br>Sunnyvale, Calif.<br>a corporation of California |

[54] TAPE TRANSPORT APPARATUS
6 Claims, 5 Drawing Figs.

[52] U.S. Cl.................................................. 242/192,
226/187
[51] Int. Cl..................................................... G11b 15/32
[50] Field of Search.......................................... 242/192,
203; 226/186, 187, 188

[56] References Cited
UNITED STATES PATENTS
3,093,284 6/1963 Mullin........................... 226/186X
3,370,803 2/1968 Newell........................... 242/192
3,408,016 10/1969 Ganske et al.................. 242/203X Primary Examiner—George F. Mautz
Attorney—Flehr, Hohbach, Test, Albritton and Herbert ABSTRACT: A tape-driving means forming a tape-engaging interface in the nip between a rotating driven body and a rotating resilient annular driving body is formed in a manner whereby increased pressure applied between the driving and driven bodies serves to cause the driven body to run slightly slower than the calculated speed of the resilient driving body. A tape transport arrangement includes supply and takeup rolls engaging the resilient driving body. Pressures are applied to urge the supply roll and takeup roll each independently into engagement with the resilient driving body. The resilient driving body is characterized by the property in that within a limited range of applied interface pressures the tape at the supply interface can be made to progress relative to the tire in either of two directions, i.e., either positively toward the takeup interface or negatively away from the takeup interface in response to lesser or greater applied pressure, respectively.

PATENTED JAN 5 1971

INVENTORS
Charles A. Vogel
James W. F. Blackie
BY Flehr, Hohbach, Test,
Albritton & Herbert
Attorneys

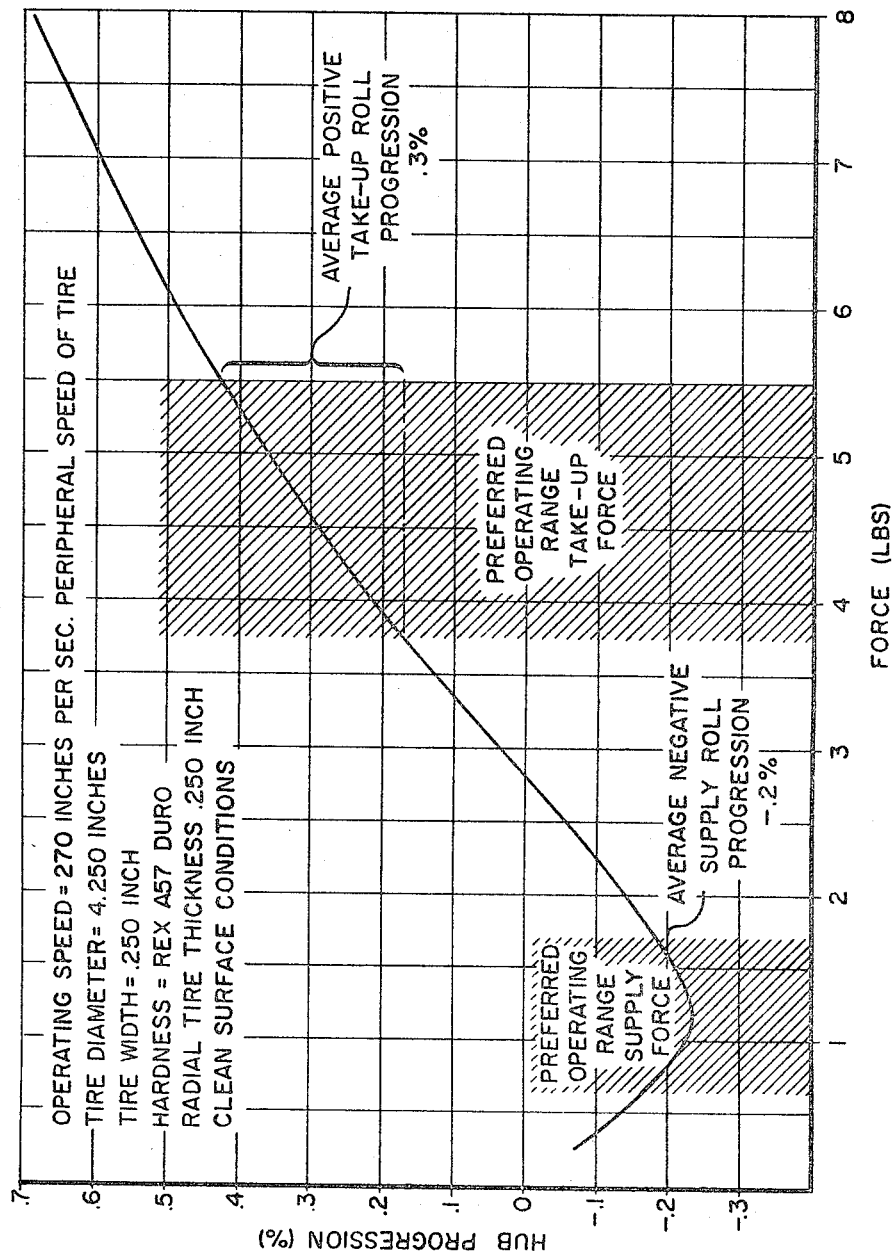

TAPE TRANSPORT APPARATUS

BACKGROUND OF THE INVENTION

This invention pertains to tape transport apparatus and more particularly to a tape-driving means forming a tape-engaging interface in the nip between a rotating driven body and a rotating resilient annular driving body.

Heretofore, as in U.S. Pat. Nos. 3,370,803 and 3,370,804, tape transports have been disclosed having a rotating drive capstan of the type formed with a resilient tire disposed in "rim-driving" relation to both supply and takeup rolls. The tape, trained around the tire of the capstan, is maintained firmly against the tire by pressing the takeup roll against the tire with a force exceeding another force pressing the supply roll against the tire. Thus, the force of compression (or hereafter pressure) at the takeup roll/tire interface is greater than at the supply roll/tire interface.

In the above type of transport, it would appear superficially that the tape speed entering and leaving the zone defined between supply and takeup interfaces should merely be the calculated speed which equals the circumference of the tire multiplied by the revolutions per minute (or other time standard). Such a calculated speed of the tire shall hereinafter be referred to as the "geometric" speed or velocity of the tire.

However, by virtue of the resilient character of the tire it has heretofore been shown that pressing a relatively harder, driven body with increasing force against against the resilient tire causes the driving surface of the resilient tire to increase in velocity locally while passing through the interface formed between tire and roll of tape. This action serves to increase the velocity of the driven member (roll), and likewise increases the velocity of tape interposed between the tire and driven body.

In prior transports, where the tape rolls ride against the tire, the local tape velocity at the supply interface tends to exceed the "geometric" speed of the tire. Thus, it has been observed that the supply roll seems to try to "overrun" the rotating capstan whereby a minute incipient loop of tape tends to commence forming at the supply roll/tire interface. Such a loop-forming tendency or incipiency provides an unsupported, longitudinal bulging of the tape over a short distance at the input end of the transducing zone defined between supply and takeup interfaces which can be undesirable. This bulging "incipient loop" can be removed by applying conventional drag forces, as by brakes, to the overall rotation of the supply roll. However, this necessitates additional structure and is subject to certain undesirable characteristics, as is known.

As disclosed herein, within a limited range of applied interface pressures, the tape at the supply interface can be made to progress relative to the tire in either of the two directions, i.e., either "positively" toward the takeup interface or "negatively" away from the takeup interface, in response to lesser or greater applied pressure, respectively. "Positive" progression can be thought of as providing a tendency for the supply roll to overrun the capstan and "negative" progression as causing the reverse condition. (In like manner, tape at the takeup interface can be made to progress relative to the tire either positively away from the supply interface, or negatively toward the supply interface.)

Within the range mentioned, by applying increasingly greater pressure at the supply interface, an increasing negative progression (or retrogression) of the tape relative to the tire can be developed at the interface. Further increases in the applied pressure beyond the limited range than serve to develop the positive progression of the tape and supply roll relative to the geometric speed of the drive capstan. (At that point where there is neither positive nor negative tape progression relative to the tire, "zero" progression may be said to occur.)

SUMMARY OF THE INVENTION AND OBJECTS

As disclosed herein, that portion of tape trained about the tire remains under slight to modest tension during transit from supply to takeup interface. This is achieved by the compressive forces applied at the take-in interface providing a positive progression of the takeup roll and tape adequate to overcome the negative progression developed at the supply interface, but less than sufficient to overcome the restraining forces of friction defined between the tire and the tape in the zone between the supply and takeup rolls. Thus, no movement of the tape relative to the tire occurs in the transducing zone.

Accordingly, in the foregoing manner the undesired incipient loop has been removed from the system herein disclosed by providing an increasing amount of negative progression over a limited range of applied pressures, without resorting to drag brakes on the supply side of the system.

It is, in general, an object of the invention to provide an improved tape-feeding nip responsive to applied forces and more particularly to provide an improved tape transport apparatus wherein a resilient annular rotating body cooperates with rolls of tape pressed thereagainst so as to tension the tape in the zone between the rolls.

It is another object of the invention to provide a tape transport apparatus wherein a single tire cooperates with different forces so as to develop both positive and negative progression at the supply and takeup rolls.

These and other objects of the invention will be more readily understood from the following detailed description of a preferred embodiment when considered in conjunction with the accompanying drawings.

BRIEF DESCRIPTION OF THE DRAWING

FIG. 4 schematically illustrates the basic components of a test mechanism for plotting the performance characteristics of various capstans;

FIG. 5 is a graph illustrating the performance characteristics of a particularly preferred capstan construction according to the invention.

DESCRIPTION OF THE PREFERRED EMBODIMENT

Figure 1:
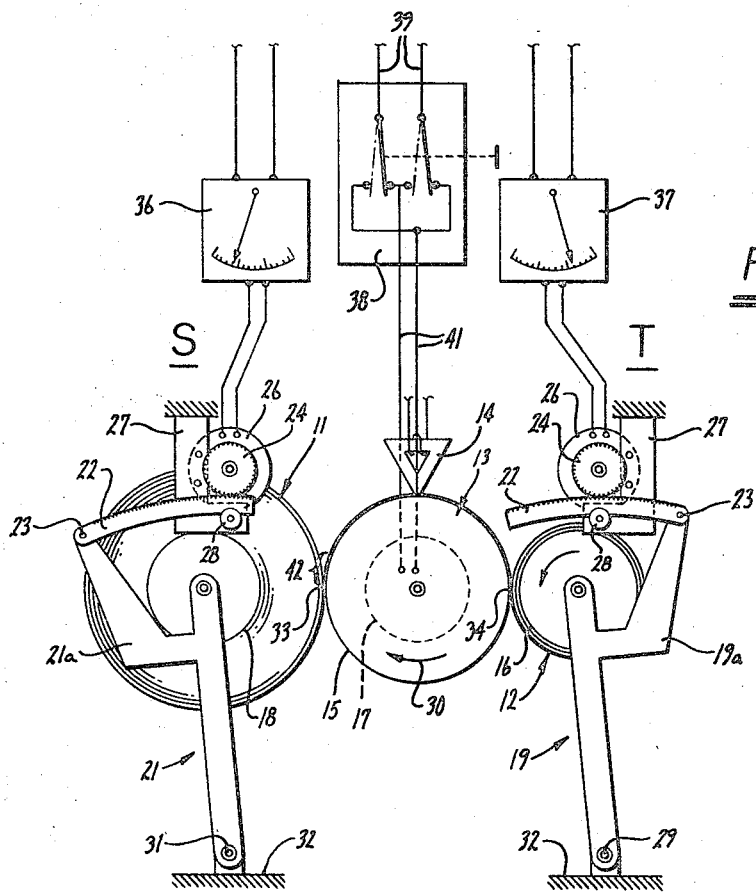
FIG. 1 is a schematic diagram showing a tape transport apparatus according to the invention.

As generally referred to above, an improved tape transport apparatus has been provided herein of the type shown in FIG. 1 characterized by an improved tire construction carried by the rotating drive capstan.

Referring to FIG. 1, a tape transport apparatus is shown of a type for feeding a length of pliable recording tape wrapped to form a supply roll 11 and to feed the tape to a takeup roll 12 by means of an annular rotating body such as the drive capstan 13 arranged to drive the rolls. Thus, the tape being unwrapped from roll 11 is carried by the peripheral resilient tire surface of capstan 13 past a transducer 14 and onto a hub 16. A drive motor, such as schematically shown at 17 serves to rotate capstan 13 at a predetermined speed of rotation.

Each hub 16, 18 is rotatably carried by suitable means to advance and retreat relative to capstan 13 during feeding of tape. Thus, each hub 16, 18 is disposed upon the end of a swing arm assembly 19, 21 respectively. Means are provided whereby each arm assembly 19, 21 will be urged toward the peripheral surface of capstan 13. At the upper end of each swing arm assembly 19, 21 a rack 22, pivotally mounted at 23 from an arm extension portion 19a, 21a respectively serves to cooperate with a drive gear 24 variably powered by a torque motor 26 to vary the compressive force to be applied between an associated roll and the capstan 13 periphery. Torque motor 26 is mounted upon a stationary member 27 forming a portion, for example, of a bed or base plate (not shown) of the transport apparatus. Each rack 22 rests on a rotatable bearing 28 formed with retaining flanges so as to maintain the teeth of rack 22 and gear 24 in continuous engagement.

Each arm assembly 19, 21 is pivotally mounted at fixed pivot points 29, 31 respectively of the base plate or frame portion 32 whereby operation of torque motors 26 serves to rotate arm assemblies 19, 21 toward the peripheral surface of capstan 13.

From the foregoing description it will be readily apparent that as capstan 13 is driven in the direction of arrow 30 tape will be unwrapped from supply roll 11 and wrapped upon takeup roll 12. It will further be evident that rolls 11 and 12 will respectively advance and retreat toward and away from capstan 13 during the transfer of tape.

It has heretofore been known that where an elastomeric-coated driving body or element forms a nip with a relatively harder driven rotating body the effect of urging the two bodies together is to increase the speed of the periphery of the driven body notwithstanding the decrease in driving radius defined on the driving body. This has heretofore been explained variously as an elastomeric flow of the material of the driving body providing the effects, by analogy, to those increases in fluid flow found in constricted portions of a liquid flow line.

In tape transport apparatus of the type shown in FIG. 1 it has heretofore been disclosed to feed tape from the supply roll 11 to the takeup roll 12 while maintaining the intermediate zone of tape under appropriate tension whereby transducing operations can be best conducted. Accordingly, it has heretofore been suggested to urge the supply roll 11 against the resilient tire 15 of capstan 13 at interface 33 (hereinafter supply interface) with a first force while urging the takeup roll 12 against the same tire 15 at interface 34 with a greater force. Thus, the meter 36 registers a first power supply to be coupled to torque motor 26 on the supply side of the transport while meter 37 registers a greater power supply to torque motor 26 on the takeup side of the transport. As noted on the meters the indicators schematically represent the greater power being supplied on the takeup side whereby the tape at takeup interface 34 will tend to be driven faster than tape at the supply interface 33.

In order to operate the transport apparatus in a bidirectional manner for both forward and reverse operation a reversing switch 38 has been coupled to a suitable power supply by leads 39 and is connected to motor 17 by means of leads 41. It is to be understood, of course, that upon reversal of the switch 38 roll 11 becomes the takeup roll and roll 12 then constitutes the supply roll.

Further, at such times as the apparatus is operated in a reverse mode of operation, the power supplied via meters 36, 37 would be reversed so as to create a tendency to feed the tape faster at interface 33 as compared to interface 34.

As mentioned above, a tendency to form an incipient loop has been observed to be substantially continuously present in that portion 42 of the tape immediately downstream of the supply interface 33. This tendency is believed to have resulted from the motion of the tape relative to the tire surface as opposed by the frictional resistance of the tire surface. This relative motion tends to develop where tape progression is positive at both the supply and takeup interfaces. In the tape transport disclosed herein a resilient annular rotating tire 15 has been formed characterized by the property whereby for a limited range of applied forces acting to compress the interface 33, the peripheral speed of the supply roll relative to the tire, can be slowed, rather than increased, in response to increases in the applied force.

This property is primarily derived from particular combinations of the hardness and radial thickness of resilient tire 15 as now to be described. Thus, by appropriate selection of forces to be applied at the two interfaces 33, 34 the rotational speed of the supply roll can be slowed with respect to the geometric speed of the capstan 13 while the rotational velocity of the takeup roll can be made to increase relative to the geometric speed of the capstan 13. Accordingly so-called negative progression will be established at supply interface 33 while a positive progression in the driving of roll 12 will be established at the interface 34.

Further, it appears that the thinner the tire 15 becomes the more will be the degree of positive progression due to the fact that the distortion of tire 15 becomes more localized as the tire becomes thinner.

It has also been observed that with a tire whose progression rate has been established by the hardness and the radial thickness of the elastomer material, the effect of lubrication of the tire/roll interface appears to accentuate such progression, whether positive or negative, and that a high degree of friction in said interface will have the opposite effect. More particularly, however, by lubrication of the tire/roll interface, inhibiting effects introduced by the presence of friction can be minimized so as to permit the degree of progression to become mainly and predominantly influenced by the action derived from the hardness and radial thickness of the tire. (These effects are explained in detail further below with reference to the graphical plots in FIG. 2.)

Figure 2:
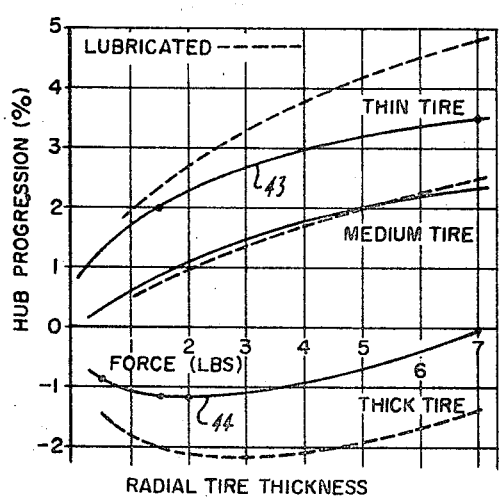
FIGS. 2 and 3 graphically illustrate performance characteristics of various capstans tested in accordance with the mechanism schematically illustrated in FIG. 4.

For example, as tested in a simple drive mechanism whereby a relatively hard rotatable hub H (schematically shown in FIG. 4) is driven by a capstan C carrying a resilient tire T therearound and operated by a motor M, a plot of hub progression, both positive and negative, has been shown in, FIG. 2 for varying radial thicknesses of tire T under different applied forces at the interface therebetween.

For example, a rather thin tire produces the curve 43 which shows a positive hub progression on the order of 2 percent in response to the application of a compressive force on the order of 1½ pounds. As this compressive force is increased, say to the order of 7 pounds, a positive hub progression on the order of 3½ percent can be established.

By making the tire T (FIG. 4) thicker it is clearly demonstrated that, as on curve 44, with the same application of forces there will be a negative progression on the order of 1¼ percent in response to 1½ pounds pressure, while further increasing the force up to 7 pounds would develop substantially zero progression.

It is to be further noted on curve 44 that application of a relatively small force such as one-half pound pressure produces a negative hub progression on the order of seven-eighths percent while further increasing the applied pressure to 2 pounds develops further negative progression to a point on the order of 1⅛ percent.

Thus it is clearly demonstrated that by increasing the radial tire thickness a tire can be constructed which is responsive to an increase in applied pressure in a manner producing an increasingly slowly moving driven hub.

From the foregoing it will be readily apparent that the above phenomenon exists only over a relatively limited initial portion of the range of applied pressures, and that only after larger pressures are applied, the elastomeric tire 15 performs in the manner taught heretofore.

By applying lubrication to the interface defined between hub H and tire T the effects of friction can be removed in large part so as to permit the radial thickness of the tire to control the above performance. In FIG. 2 the dashed lines represent a plot for each of the three tires noted, namely a thin tire, a medium thickness tire and a relatively thick tire, when lubricated. The three tires each have the same hardness characteristic.

Figure 3:
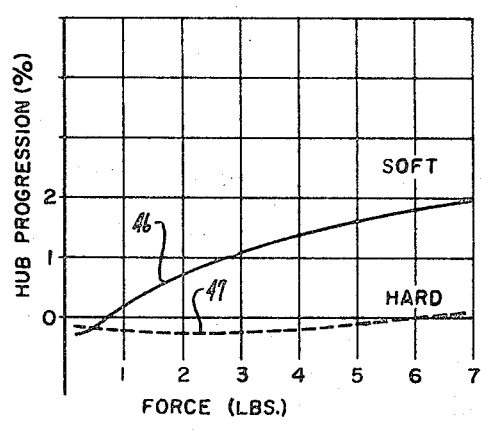

Another parameter serving to contribute to the formation of a resilient annular rotating drive body characterized by the above property of developing negative progression of the driven body is found in the tire hardness. Thus in FIG. 3 there is shown a curve 46 produced where tire T is of relatively soft resilient material while the curve 47 represents a plot for a resilient tire T of substantially double the hardness of that involved with curve 46. The thickness of each of these two tires is, of course, identical in order to restrict the plot to show the effect of a single variable.

It is readily apparent that negative hub progression is developed with the harder tire T over a relatively large range of applied pressures extending up to a pressure on the order of 5½ pounds. The softer tire plotted by curve 46 provides positive progression at a relatively early level of pressure.

Having in mind the foregoing demonstrated effects in developing negative progression based upon considerations of tire thickness and hardness, FIG. 5 shows a curve 48 for a particularly preferred tire 15 characterized by properties acting in response to a limited range of pressures providing negative progression at the supply interface 33 and positive progression at the takeup interface 34.

Thus, for example, for the tire construction plotted in FIG. 5, a force applied at the supply tire interface on the order of 0.75 or 1.60 pounds provides a negative progression on the order of (−) 0.2 percent while a force applied at the takeup tire interface on the order of 4.6 pounds develops a positive progression on the order of (+) 0.3 percent. By making the positive progression at the takeup interface slightly greater than the negative progression at the supply interface, the negative supply progression and friction forces developed between tape and tire substantially counterbalance the positive takeup progression, which otherwise would tend to cause the tape to move with respect to the tire in a direction relatively toward the takeup roll.

For the tire construction of FIG. 5, so long as the supply force remains less than 2.75 pounds and the takeup force remains greater than 2.75 pounds, widely varying forces can be employed without causing the tape movement relative to the tire. However, the ranges shown in FIG. 5 are preferred due to other practical mechanical considerations.

It has been observed that the appropriate positive progression at takeup interface 34 ought to be greater than the negative progression that we find at the supply interface 33 but less than sufficient to overcome the restraint of friction acting on the tape between tape and capstan in the region defined between interface 33 and interface 34. Otherwise, if the positive progression should exceed this amount a limited undesirable relative movement between tape and tire 15 will develop. If the positive progression at takeup interface 34 is held below such an amount then the tape in the transducing zone between supply and takeup rolls will be properly tensioned and the tendency to form an incipient loop in the region 42 eliminated.

In operation tape threaded about tire 15 and wrapped upon takeup hub 12 is fed by energizing motor 17 in a forward direction. At the same time the power supplied to the takeup torque motor 26 is adjusted to provide greater compressive forces at interface 34 than exist at interface 33. By virtue of the improved capstan tire construction formed about capstan 13 a slight, though measurable, negative progression of the speed of tape at interface 33 will develop so as to apply a very slight retardation of the incoming speed of the tape.

At the output interface 34 the compressive force developed by its associated torque motor 26 causes a slight positive progression whereby the output speed of the tape tends to try to increase thereby tensioning that span of tape defined between supply and takeup rolls.

Transducer operations by means of the head 14 disposed to cooperate with the tape in that zone can then be best performed.

We claim:

1. In a tape transport of a type for feeding a length of pliable tape wrapped to form supply and takeup rolls, apparatus comprising means rotatably supporting said supply and takeup rolls, annular rotating tape drive means having resilient arcuate surface portions disposed to rotate the supply and takeup rolls to feed tape from the supply to the takeup roll, and means active during the transfer of tape from said supply roll to said takeup roll for developing a first compressive force having a magnitude in a predetermined range between said supply roll and said surface portions and a second compressive force having a magnitude outside said predetermined range between the takeup roll and said surface portions, and a resilient body forming said surface portions, said body being characterized by properties such that said first compressive force causes local compression of said tape in such manner that the linear peripheral speed of the supply roll is decreased relative to the geometric peripheral velocity of said surface portions and increases in said second compressive force produce an increase in the linear peripheral speed of the takeup roll relative to the geometric peripheral velocity of said surface portions.

2. Tape transport apparatus according to claim 1 wherein said properties include the hardness and depth of said body.

3. Tape transport apparatus according to claim 1 together with means for maintaining the magnitude of said second force greater than the magnitude of said first force so that the increase in speed at said takeup roll is greater than the decrease in speed at said supply roll but by an amount less than sufficient to overcome the restraint of friction acting on the tape in the region defined between the tape and said resilient body.

4. In a tape transport of a type for feeding a length of pliable recording tape, a tape engaging and feeding nip comprising a driving body, said driving body including an annular rotating driving element, a resilient body carried by said element, a rotatable driven body forming a nip with said resilient body adapted to receive and feed tape therethrough, said driven body being harder than said resilient body, said resilient body being characterized by a hardness and thickness such that an increase in compressive force applied between said driving and driven bodies over a predetermined range tends to decrease the tape speed through said nip relative to the geometric peripheral velocity of said driving body.

5. In a tape transport according to claim 4 wherein said resilient body includes the further property in that increases in said compressive force outside said predetermined range serve to increase the tape speed through said nip relative to the geometric peripheral velocity of said driving body.

6. In a tape transport of a type for feeding a length of pliable recording tape wrapped to form supply and takeup rolls, apparatus comprising means rotatably supporting the rolls, capstan means disposed in common with both said rolls to form a driving interface with both rolls, means serving to apply a first force urging the takeup roll against the capstan means and to apply a second force urging the supply roll against the capstan means, said capstan means having resilient arcuate annular surface portions, the resilient arcuate surface portions being characterized by a radial thickness and hardness responsive both to said first compressive force applied at the supply interface tending to diminish the peripheral speed of the supply roll relative to the geometric speed of the surface portions and also to said second compressive force applied at the takeup interface tending to increase the peripheral speed of the takeup roll relative to the geometric speed of the surface portions.